Oct. 11, 1966   R. W. DOCHTERMAN   3,278,776
ELECTRIC MOTOR CONSTRUCTION
Filed April 2, 1964   2 Sheets-Sheet 1
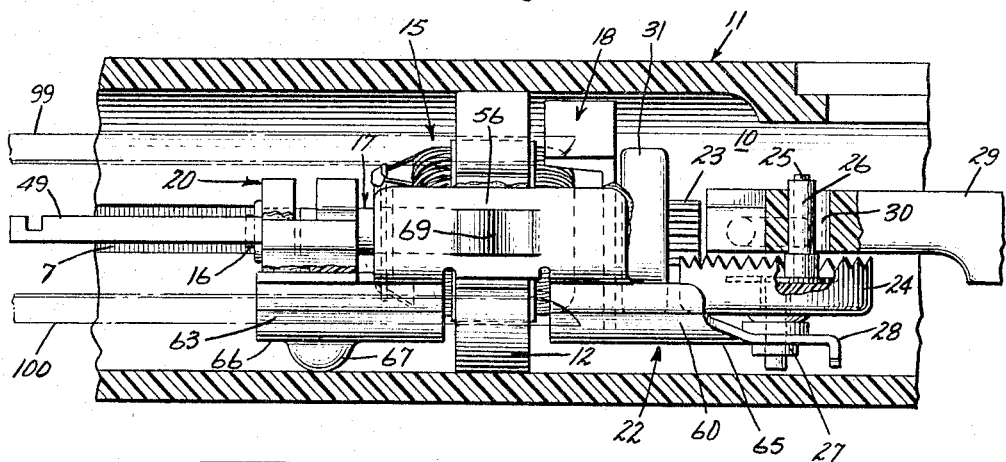
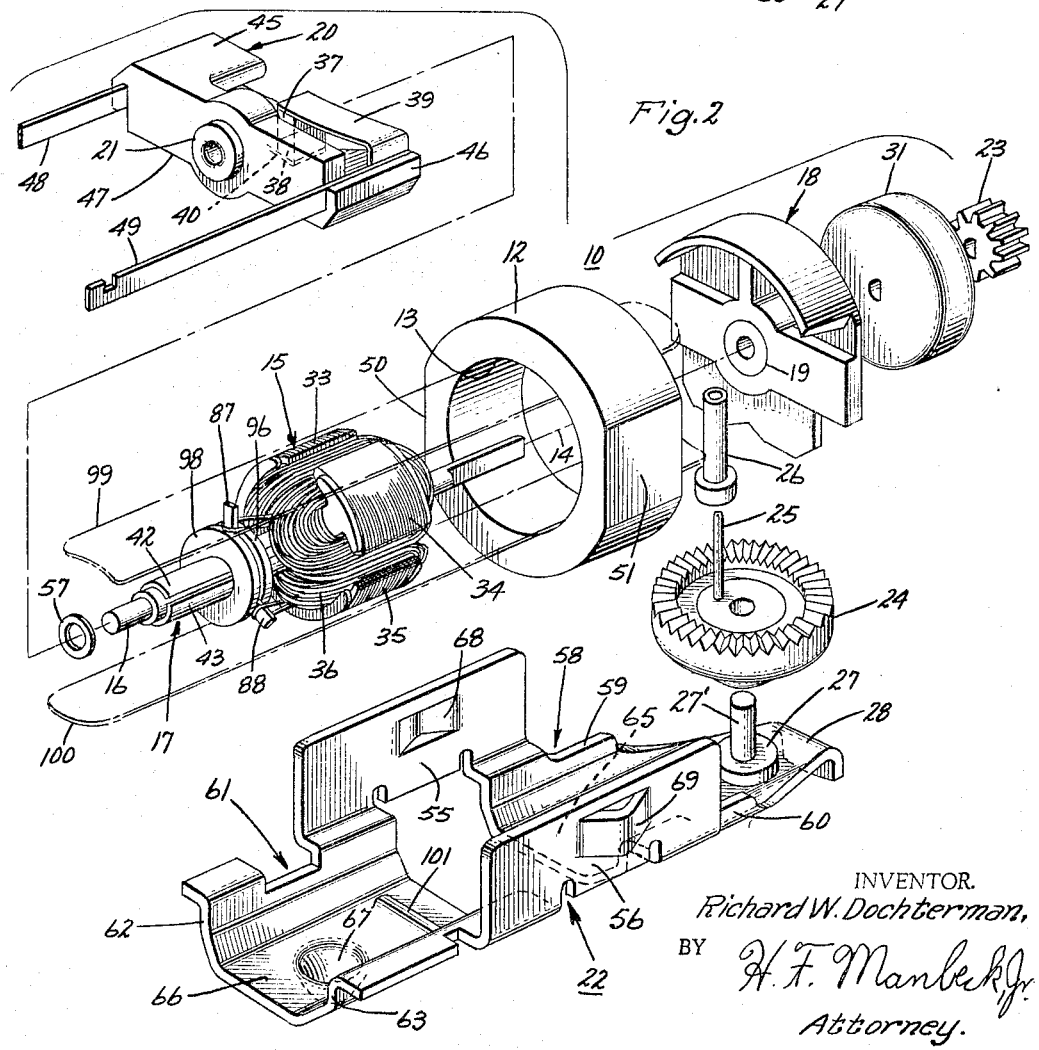
INVENTOR.
Richard W. Dochterman,
BY H. F. Manbeck Jr.
Attorney.

Oct. 11, 1966  R. W. DOCHTERMAN  3,278,776
ELECTRIC MOTOR CONSTRUCTION
Filed April 2, 1964  2 Sheets-Sheet 2
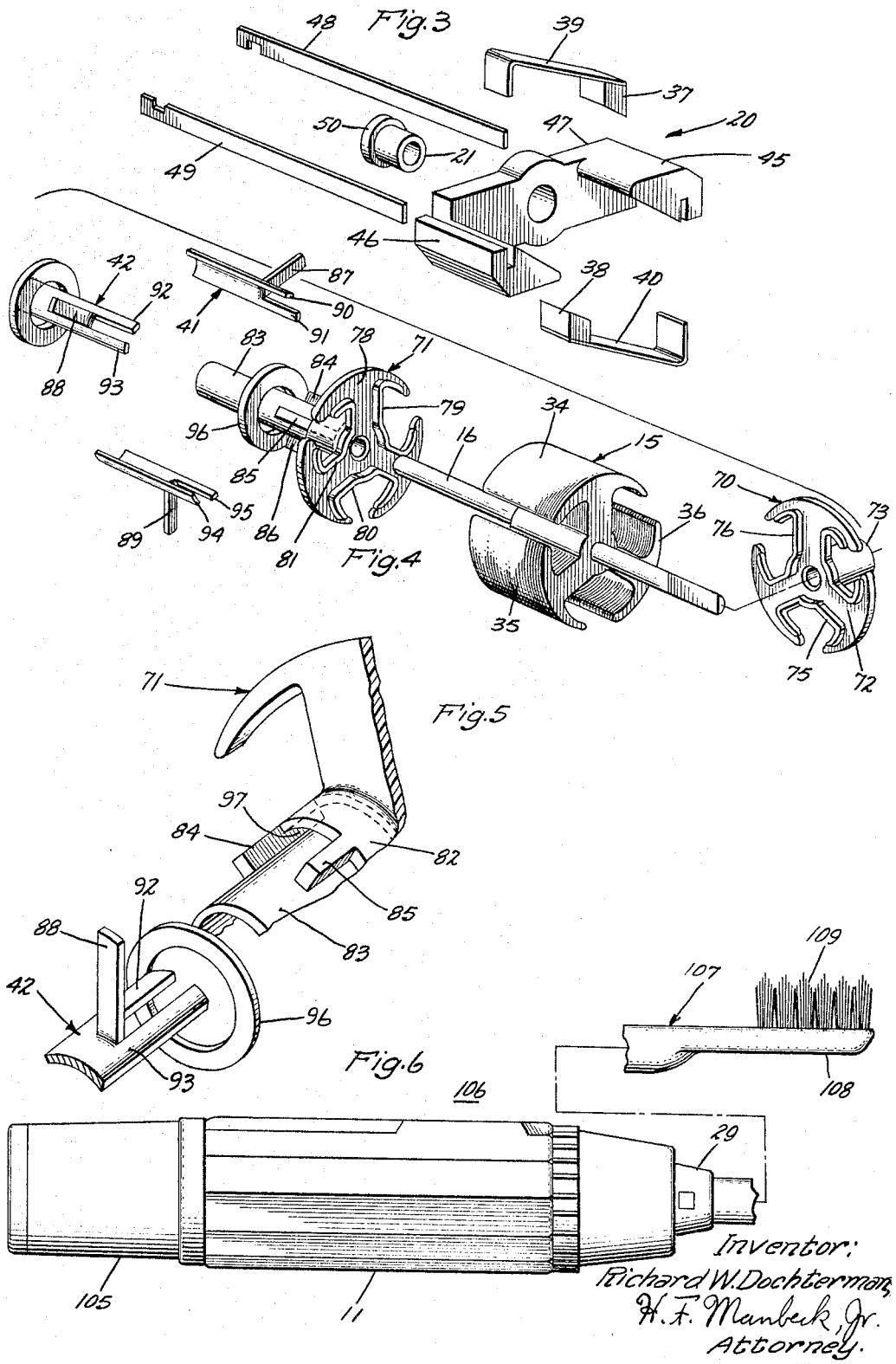

United States Patent Office 3,278,776
Patented Oct. 11, 1966

3,278,776
ELECTRIC MOTOR CONSTRUCTION
Richard W. Dochterman, Fort Wayne, Ind., assignor to General Electric Company, a corporation of New York
Filed Apr. 2, 1964, Ser. No. 356,904
11 Claims. (Cl. 310—154)

This invention relates to electric motors and more particularly to miniature motors of the direct current type.

Where a miniature electric motor is used to drive a hand held appliance, such as an electric toothbrush, the motor is usually housed in an elongated case that serves as the handle and that may also provide an enclosure for a battery and the components of a battery charging circuit. The diameter of the motor is generally the controlling factor that determines the transverse dimensions of the handle. In order to maintain the transverse dimensions of the hand held appliance with predetermined limits, it is desirable, if not necessary, that the transverse dimensions of the motor be kept at a minimum, preferably about 1 inch in diameter or less.

Normally, it may be expected that such hand held appliances will be accidentally dropped by the user occasionally. Thus, it is also desirable that the motors used in hand held appliances be of sufficiently rugged construction so that they may be capable of withstanding the impact resulting from a fall of the appliance from the hand of the user to the floor. Also, in applications of miniature motors to hand held appliances, it is usually required that the motor be coupled and aligned with a motion translating mechanism.

In an electric toothbrush, for example, the speed of rotation of the motor shaft must be reduced and translated into a reciprocating or oscillatory motion. To provide dependable and reliable service for both the motor and speed translating mechanism, it is necessary that the motor be properly aligned with the mechanism. Likewise, to prevent premature motor failures, it is necessary that the motor bearings be properly aligned with respect to each other and that a predetermined gap be maintained between the stator and armature. Upon any event, it is, of course, always desirable that these requirements be readily effected by the employment of economic manufacturing techniques. In this connection, the parts for the motor should be designed so that precise tolerances are not required and so that assembly and alignment procedures are simplified.

Accordingly, it is a general object of the invention to provide an improved electric motor of the miniature type for use in hand held electric appliances.

It is a more specific object of the invention to provide an improved D.C. miniature motor for use in hand held appliances, such as an electric toothbrush motor wherein the transverse dimensions of the electric motor are effectively minimized.

Another object of the invention is to provide an improved motor frame construction that permits the components of the motor to be readily assembled and aligned with respect to each other and with respect to a gear train or other motor translating mechanism.

It is still another object of the present invention to provide an improved commutator and brush arrangement for an electric motor of the miniature type that is rugged and reliable and that can be economically assembled.

A further object of the present invention is to provide an improved electric motor of the miniature type having elements that can be bonded to the motor frame to form a rugged unitary construction.

In accordance with one form of my invention I have provided an improved miniature motor for operation from a D.C. supply such as a battery. The electric motor includes a permanent magnet stator with an armature-receiving opening disposed around a central axis. Preferably, a pair of spaced apart and diametrically opposed flats are formed on the outer periphery of the stator to provide a bonding surface for the motor frame. The motor frame is formed with a pair of spaced apart support portions that are bonded to the flats on the stator by means of a suitable adhesive means such as a thermosetting resin. In order to provide a rugged and unitary frame arrangement for the motor and its associated components, the frame is formed with a first channel-like section having sides extending from one side of the support portions and connected by a web. Also, the frame is formed with a second channel-like section with sides extending from the other side of the support portions and connected by a web. Both webs of the channel-like sections are located preferably at a radial distance from the central axis not greater than the maximum radial dimension of the stator.

The armature and commutator is carried on a shaft rotatably supported in a first and second motor bearing. The first motor bearing is supported in a bearing support element bonded to the frame and the second motor bearing is supported in a transversely extending support element bonded to the sides of the second channel-like section. Preferably, the last-mentioned support element is formed with a pair of axial extensions. Each of the axial extensions have a cantilever spring extending transversely from the axial extension and supported therefrom. Further, each of the cantilever springs has a brush carried at the free end thereof for engagement with the commutator. The transversely extending support element is spaced from the web of the second channel-like section to permit a shim to be passed therebetween for insertion between the armature and he stator. With such an arrangement it is possible to maintain the gap between the armature and stator with shims while the support elements and the stator are bonded to the frame.

According to another aspect of the invention I have provided an improved insulator for the commutator segments and armature windings. The insulator is formed with a radial flange that generally conforms to the side face of the armature core and that is provided with lips thereon extending axially into the slots of the core at the corners to protect and insulate the windings from the core. Further, the insulator is formed with a hub portion and an elongated tubular portion having a central opening adapted to receive the motor shaft. The hub portion of the insulator is formed with a plurality of angularly spaced ribs extending therefrom and is also formed with axially extending recesses formed therein between the ribs.

The commutator segments have a generally arcuate shape that conforms to the curvature of the elongated tubular portion on which the segments are disposed. Each of the commutator segments are provided with a pair of fingers that straddle one of the ribs on the hub portion and that extend into the adjacent recesses formed therein thereby to circumferentially position the commutator segments on the insulator. Also, each of the commutator segments has a soldering post upstanding therefrom that is formed from a portion of the commutator segment cutout to form the fingers. At least one insulating washer is coaxially disposed around the commutator segments to maintain the radial position of the commutator segments. In order to hold the commutator segments and insulator in rigid assembled relation, the parts thereof are bonded together by means of a suitable resin adhesive.

With the improved frame arrangement the precise alignment of the motor bearings can be readily achieved since the bearing support elements can be glued to the frame while shims are in position between the armature and stator. Thus, it is possible thereby to provide a rugged unitary motor construction. Further, by extending the length of the frame to provide a support for other auxiliary components associated with the motor, alignment of the motor with respect to these components can also be readily achieved because of the unitary frame arrangement. Significantly, it is possible to economically achieve a unitary type of construction without adding to the transverse dimensions of the motor thereby making the improved arrangement particularly adaptable for use in hand held appliances and the like.

The subject matter which I regard as my invention is set forth in the appended claims. The invention itself, however, together with further objects and advantages thereof may be understood by referring to the following description taken in connection with the accompanying drawings in which:

FIGURE 1 is a side elevation of the motor shown enclosed in a sectionalized plastic case, a part of which only is shown;

FIGURE 2 is an exploded perspective view of the motor embodying one form of the invention showing the relationship of the parts and various subassemblies;

FIGURE 3 is an exploded perspective view of the brush and bearing assembly;

FIGURE 4 is an exploded perspective view of the armature and commutator assembly;

FIGURE 5 is a fragmentary perspective view of a commutator segment and the insulator illustrating detailed features thereof; and FIGURE 6 is a side elevation of an electrical toothbrush utilizing the improved motor shown in FIGURE 1.

Referring now more particularly to the accompanying drawings in which like numerals indicate like parts throughout the several views, I have identified the electric motor embodying one form of the invention generally by the reference numeral 10. As will hereinafter be more fully described, the motor 10 is a unit entirely independent of its housing or case which is identified generally by the reference numeral 11.

As is best seen in FIGURES 1 and 2, the motor 10 includes a permanent magnet, a stator 12 formed with an armature-receiving opening 13 disposed around a central axis 14 which is the axis of rotation of an armature 15. The motor 10 includes the armature 15 with a motor shaft 16, a commutator 17, a bearing support assembly 18 carrying a bearing 19, and a bearing and brush assembly 20 carrying a bearing 21 and a motor frame 22. The motor 10 is coupled with a motion translating mechanism which includes a pinion gear 23 attached to the motor shaft 16, a face gear 24, an eccentric arm 25, a bushing 26, a bearing 27 supported in an extension 28 of the motor frame 22, a connecting rod 29 (see FIGURE 1) with a slot 30, and a flywheel 31. With the motor 10 coupled as shown with the motion translating mechanism a reciprocating movement of the connecting rod 29 is effected, and this movement can be imparted to a toothbrush or other device which is to be driven by the motor 10.

The armature 15 is comprised of ferrous laminations having a configuration that provides three armature poles 33, 34 and 35 (see FIGURE 2). The armature laminations are stamped out of conventional ferrous metal such as electrical sheet steel. Appropriate windings 36 are conventionally wound around the armature poles 33, 34 and 35. To supply current to the armature windings 36 two diametrically opposed brushes 37 and 38 are provided. Preferably, the brushes 37, 38 are comprised of a silver graphite material in order to provide a good electrical contact, low friction losses and a low voltage drop.

The brushes 37, 38 are supported at the free end of cantilever springs 39, 40 which bias the brushes 37, 38 in electrical contact with the commutator segments 41, 42 and 43. At the other end the cantilever springs 39, 40 are engaged in slots formed in axial extensions 45 and 46 formed in a support element 47 made of plastic material, as is best seen in FIGURE 2. Connected in electrical circuit with the cantilever springs 39, 40 are a pair of copper terminals 48 and 49 which are adapted for connection to a source of direct current, such as a battery. It will be noted that the support element 47 extends transversely across the frame 22 and is glued thereto by a suitable resin adhesive, as will hereinafter be more fully described. The bearing support element 47 is formed with a bore intermediate the ends thereof which carries the motor bearing 21. The radial surface of the bearing 21 is adapted to receive a thrust washer 57 to take up the axial thrust of the armature 15 during operation. Preferably, the bearing 21 is made of a porous sintered metal.

Having more specific reference to the exploded view of FIGURE 2, I will now more fully describe the motor frame arrangement. It will be noted that the motor frame 22 is formed with a pair of laterally spaced support portions 55 and 56 which are attached to flats 50 and 51 formed on the outer periphery from the permanent magnet stator 12. A first channel-like section 58 is formed with sides 59, 60 from the support portions 55, 56 at one side, and a second channel-like section 61 is formed with sides 62, 63 depending from the support portions 55, 56 at the other side. The sides 59 and 60 of channel-like section 58 are connected by a web 65. Similarly, the sides 62, 63 of channel-like section 61 are connected by a web 66. Web 66 is formed with a rounded projection 67 to provide a point support for the frame 22 in the case 11. A pair of lanced portions 68 and 69 disposed in grooves in the case 11 prevent rotational movement of the motor 10 relative to the case section 11 and to position the motor 10 in the case section 11.

As is best seen in FIGURE 1 the strap portions 55, 56 and the depending channel-like sections 58, 61 provide an opening for accommodating the permanent magnet stator 12 which extends beyond the webs 65, 66 of the sections 58, 61. In accordance with the improved frame arrangement the webs 65 and 66 are located at a radial distance from the central axis 14 that is not greater than the maximum radial dimension of the stator 12. With the improved frame arrangement the maximum transverse dimensions of the motor are controlled essentially by the diameter of the outer periphery of the permanent magnet stator where the outer periphery is circular as shown. Where the outer periphery of the stator is elliptical, the maximum radial dimension will be along the major axis of the ellipse. Since the improved frame arrangement does not add to the transverse dimensions of the motor 10, it is possible to obtain a miniature motor with minimal transverse dimensions that is particularly adapted for use with hand held appliances.

Having more specific reference now to FIGURE 4 it will be seen that the armature 15 includes an insulator 70 at the driving end of the motor shaft 16 and insulator 71 at the commutator end of the motor shaft 16. The insulators 70 and 71 are molded out of plastic insulating material such as glass filled nylon. The insulator 70 at the driving end of the shaft 16 has a radial flange 72 that generally conforms to the configuration of the side face of the armature core. Also, the insulator 70 has an integrally formed hub portion 73 with a shaft-receiving opening, and the radial flange 72 is formed with lips 74, 75 and 76 along the slot edges. The lips 74, 75 and 76 extend axially a short distance into the winding slots and prevent the corners of the slots from cutting through the insulation on the magnet wire of the windings 36. The radial flange 72 generally covers the side face of the core and cooperates with the flange 78 of insulators 71 to permit the windings 36 to be tightly wound around the poles 34, 35 and 36 without damaging the magnet wire insulation. The hub portion 73 provides insulation between the shaft 16 and the end turns of the armature windings 36.

In addition to providing insulation for the armature windings 36 at the commutator end of the motor 10, the insulator 71 serves as a part of the insulating means for the commutator segments and windings 36. The insulator 71 is also formed with a radial flange 78 that generally conforms to the configuration of the end face of the armature core and has axially extending lips 79, 80 and 81 to provide corner coverage for the rotor laminations. It will be noted that the insulator 71 is also formed with a hub portion 82 and an elongated tubular portion 83. The hub portion 82 has three angularly spaced apart radial ribs 84, 85 and 86 to provide the spacing between the commutator segments 41, 42 and 43. The elongated tubular portion 83 insulates the commutator segments 41, 42 and 43 from the shaft 16.

The commutator segments 41, 42, and 43 are made of conductive material such as copper and are formed with a soldering post 87, 88 and 89 which are cut out from the segments to define three pairs of fingers 90, 91, 92, 93, 94 and 95. These fingers straddle ribs 84, 85 and 86 respectively on the hub portion 82. As is best seen in FIGURE 5, segment 42 is assembled through an insulating washer 96 so that the washer 96 is positioned between the soldering post 88 and ribs 84, 85 and so that the ends of the fingers 92 and 93 project into axially extending recesses 97 adjacent to the rib 85. The other segments 41 and 43 are assembled on the insulator 71 in a similar manner. The insulating washer 96 is interposed between the soldering posts 87, 88, 89 and the hub portion 82 to hold the segments 41, 42 and 43 on the elongated tubular portion 83 and to position leads from the armature windings 36. A second insulating washer 98 is assembled over the segments 41, 42 and 43 to firmly hold the segments in place. A resin adhesive is applied to the fingers of the commutator segments 41, 42 and 43 to bond the fingers to the hub portion 82 and thereby complete the commutator assembly.

In order to assemble the motor 10, shims 99 and 100 are inserted between the armature 15 and stator 12 to provide the desired gap and to hold the armature 15 in its proper alignment with respect to the bore 13. The bearing support element 18, the flywheel 31 and pinion gear 23 are assembled on the driving end of the shaft 16 and the commutator end of the shaft 16 is inserted between the brushes 37, 38 so that the brushes will engage the commutator and so that the thrust washer 57 is interposed between the radial face of the motor bearing 21 and the end of the elongated tubular portion 83.

The face gear 24 is preassembled on the axle 27' and the thrust bearing bushing 27 which is riveted to the extension 28 of the motor frame 22. With the shims in position the entire assembly including the stator 12, armature 15, pinion gear 23, flywheel 31, bearing support assembly 18 and bearing and brush support assembly 20 is placed in the motor frame 22 and aligned so that the pinion gear 23 properly meshes with the face gear 24. Further, the support portions 55, 56 of the frame 22 are engaged with the flats 50, 51 formed on the diametrically opposite sides of the permanent magnet stator 12. In the illustrated embodiment the components were essentially aligned when the lower shim 100 rests on the rib 101 on the web 66 and the pinion gear 23 is in mesh with the face gear 24.

With the components of the motor 10 properly positioned in the frame 22 a suitable adhesive, such as an epoxy resin, is now applied upon the outer edges of the bearing support assembly 18 and frame to bond these parts. Also, the resin adhesive is applied to join the support portions 55, 56 to the permanent magnet stator 12 and to bond the ends of the bearing and brush support assembly to the side walls 62 and 63 of channel-like section 61 of the frame 22. After the resin adhesive is cured, the shims 99 and 100 may be removed, and the motor 10 and face gear 24 are now ready for assembly in the hollow case 11.

It will be noted that the strap portions 55 and 56 in the illustrated embodiment of the invention are formed with lanced portions 68 and 69 which engage grooves 70 formed on the inside of the motor case section 11 and prevent any rotational movement of the motor within the housing. The electric motor is arranged to be driven by a battery (not shown) which is housed in a battery section (see FIGURE 6). The two motor terminals are connected in electrical circuit with the negative and positive terminals of the battery.

As is shown in FIGURE 6 the housing sections 11 and 105 of an electric toothbrush 106 are generally cylindrical in shape and may be made of any suitable material such as a molded plastic composition. The toothbrush 107 which is driven by the motor 10 comprises a shank 108 having bristles 109 mounted at one end in a generally conventional manner. The shank 108 of the toothbrush 107 is adapted to be connected with the connecting rod 29 which is reciprocally driven by the motor 10.

From the foregoing description of the motor and its application to a hand held appliance, it will be apparent that the improved motor frame arrangement makes it possible to provide a rigid structural support for the components of the motor without adding to the transverse dimensions of the motor. Further, with the improved frame arrangement it is possible to achieve a unitary motor construction since shims for fixing the gap between the rotor and stator can be left in place while the bearing and brush support assemblies are bonded to the frame. Also, with the improved arrangement the alignment of the motor with respect to a motion translating means is facilitated.

Although in the illustrated embodiment of the invention only a face gear was supported by the motor frame, it will be apparent that the motor frame can be extended to provide a rigid and unitary assembly for other auxiliary components used in conjunction with the motor. Further, it will be apparent that many other modifications may be made. It will be understood, however, that the embodiment which I have disclosed and described herein is intended for illustrative purposes only. It is intended therefore by the appended claims to cover all such modifications that fall within the true spirit and scope of the invention.

What I claim as new and desire to secure by Letters Patent of the United States is:

1. An electric motor comprising a permanent magnet stator having a central opening and a pair of spaced apart and diametrically opposed flats formed on the outer periphery of said stator, a frame having a pair of spaced apart support portions joined with the flats on said permanent magnet stator, said frame including a first channel-like section having a web connecting the sides thereof and depending from said support portions, said frame also including a second channel-like section having sides depending from said support portions and having a web connecting said sides, a motor shaft having a driving portion and a commutator portion, an armature carried on said motor shaft and disposed within the central opening of said stator, said armature including a core and windings, a plurality of commutator segments carried on said shaft and electrically connected with said windings, means insulating said windings and commutator segments, a bearing assembly including a support element bonded to said frame and supporting a first motor bearing, said driving portion of the shaft being journaled in said first motor bearing, a bearing and brush assembly including support element extending transversely across the sides of said second channel-like section, said bearing and brush support element having a second motor bearing carried therein at an intermediate location between the ends thereof, said commutator portion of said motor shaft being journaled in said second motor bearing, a pair of axial extensions formed on said bearing and brush support element, each of said axial extensions supporting a cantilever spring having a brush at the free end thereof for engagement with the commutator segments, said motor further including at least one opening in axial alignment with said central opening and radially outwardly of said second motor bearing to permit a shim to pass therethrough for insertion between the armature and stator.

2. The electric motor set forth in claim 1 wherein said means insulating said windings and commutator segments is comprised of an insulator having a radial flange generally conforming to the end face of the core and having lips formed thereon extending axially into slots of said core to protect the windings, said insulator also being formed with a hub portion and an elongated tubular portion, said hub portion and elongated tubular portion having a central opening with the motor shaft disposed therein, said hub portion having angularly spaced ribs extending therefrom and having axially extending recesses formed therein between said ribs; wherein each of said commutator segments has an arcuate shape conforming to the curvature of said elongated tubular portion and includes a pair of fingers straddling one of said ribs and extending into recesses formed in the hub portion of said insulator, each of said commutator segments having a soldering post upstanding from said segment and formed from a portion of the commutator segment cutout to form said fingers; and wherein at least one insulating washer is coaxially disposed around said commutator segments, and a resin adhesive means bonds said commutator segments and said insulator in assembled relation.

3. An electric motor comprising a permanent magnet stator defining an armature-receiving opening disposed around a central axis, said permanent magnet stator having spaced apart flats formed on the outer periphery of said stator, a frame having a pair of axially extending and spaced apart support portions embracing said flats, said frame including a first channel-like section having sides depending from said support portions and connected by a web, said web being located at a radial distance from the central axis not greater than the maximum radial dimension of the stator, said frame also including a second channel-like section with sides depending said support portions, said sides of said second channel-like section connected by a web, said web of the second channel-like section also being located at a radial distance from the central axis of the stator not greater than said maximum radial dimension of said stator, a motor shaft having a driving portion and a commutator portion, an armature including a core and winding, and said armature rotatably carried on said motor shaft, a plurality of commutator segments carried on said shaft and electrically connected with said windings, means insulating said commutator segments, a bearing assembly including a first support element carrying a first motor bearing, said first support element being bonded at the ends thereof to said frame to position said first motor bearing, said driving portion of said motor shaft journaled in said first motor bearing, a bearing and brush assembly including a second support element extending transversely across the sides of said second channel-like section and bonded thereto, and a pair of cantilever springs extending from said second support element and having brushes carried at the free ends of said cantilever springs for engagement with the commutator segments, and said motor further including an opening spaced in axial alignment with said central opening and radially outwardly of said motor shaft to permit a shim to pass therethrough for insertion between said armature and stator.

4. The electric motor set forth in claim 3 wherein said means insulating said commutator segments is comprised of an insulator formed with a hub portion and an elongated tubular portion, said hub portion and said elongated tubular portion having a central opening with the motor shaft disposed therein, said hub portion having angularly spaced ribs extending therefrom and a plurality of axially extending recesses formed therein between said ribs; wherein each of said commutator segments has an arcuate shape conforming to the curvature of said elongated tubular portion and includes a pair of fingers straddling one of said ribs and extending into recesses formed in the hub portion of said insulator, each of said commutator segments having a solder post upstanding from said segment and former from a portion of the commutator segment cutout to form said fingers; and wherein at least one insulating washer is coaxially disposed around said commutator segments, and a resin adhesive means bonds said commutator segments and said insulator in assembled relation.

5. An electric motor comprised of an essentially ring-shaped permanent magnet stator, an armature, a commutator, a motor shaft carrying said armature and commutator for rotation about a central axis, a frame formed with a pair of spaced apart support portions, a first and a second channel-like section extending from said support portions generally in the direction of the central axis, each of said first and second channel-like sections having a web joining the sides thereof, said webs extending in a plane substantially parallel to said central axis and spaced therefrom not more than a distance equal to the maximum radial dimension of said permanent magnet stator, a first bearing assembly including a support element carrying a first motor bearing, said motor shaft being journaled in said first motor bearing, a bearing and brush assembly including a second support element supporting a second motor bearing and also including a pair of axial extensions, said second support element extending transversely across said second channel-like section and space from the web to provide clearance for a shim to pass therebetween for insertion between the armature and stator, said motor shaft being journaled in said second motor bearing, a first cantilever spring supported at one end by one of said extensions and carrying a brush at the free end thereof, and a second cantilever spring supported at one end on said other axial extension and carrying a brush at the free end thereof, said brushes being biased into engagement with said commutator, said stator and said first and second support elements being bonded to said motor frame by a resin adhesive means.

6. An electric motor for use in conjunction with a hand held appliance comprising: a permanent magnet stator having a central armature-receiving opening, a frame having a pair of spaced apart support portions attached to said permanent magnet stator, said frame including a channel-like section having sides extending from said support portions and having a web connecting said last-mentioned sides, a motor shaft, an armature including a core and windings, a commutator including commutator segments connected electrically with said windings, said armature and commutator being carried on said motor shaft, means insulating said windings and said commutator segments, a bearing support assembly including a first support element carrying a first motor bearing and attached to said frame, and a bearing and brush assembly including a second support element bridging the sides of said channel-like section and attached thereto, said second support element carrying a second motor bearing, said motor shaft being journaled in said first and second motor bearings, said bearing and brush assembly including electrical brush means for connection with a direct current source and engaging said commutator segments, and said second support element being spaced from the web connecting the sides of said second channel-like section to permit a shim to pass therebetween for insertion between the armature and stator.

7. The electric motor set forth in claim 6 wherein a channel-like section extends from said support portions to mount at least one other component of the hand held appliance.

8. An electric motor for use in a hand held appliance, said electric motor comprising a permanent magnet stator defining an armature-receiving opening disposed around a central axis, a frame having a pair of axially extending and spaced apart support portions bonded to said permanent magnet stator, said frame including a first channel-like section having sides extending from said support portions and connected by a web, said frame also including a second channel-like section with sides also extending from said support portions and connected by a web, said webs being located at a radial distance from the central axis not greater than the maximum radial dimension of said stator, one of said channel-like sections having an extension for supporting at least one component assembly of the hand held appliance, a motor shaft, a commutator, an armature including a core and windings, said commutator and armature rotatably carried on said motor shaft, a bearing assembly including a first bearing support element carrying a first motor bearing, a bearing and brush assembly including a second support element carrying a second motor bearing, said motor shaft being journaled in said first and second motor bearings, said bearing and brush assembly also including an electrical brush means for connection with a direct current source and engaging said commutator, said second support element bridging the sides of said second channel-like section to permit shims to be passed above and below said second support element for insertion between the armature and rotor of said motor and said first and second support elements being bonded to said frame by resin adhesive to provide a unitized frame and support element assembly for said motor.

9. The electric motor set forth in claim 8 wherein said electrical brush means includes a pair of cantilever springs extending from said second support element, said cantilever springs having brushes carried at the free ends thereof for engagement with said commutator.

10. The electric motor set forth in claim 8 wherein said commutator includes the plurality of commutator segments, an insulator having a radial flange generally conforming to the side face of the core of said armature, said insulator including a hub portion and an elongated tubular portion, said hub portion and elongated tubular portion having a central opening with the motor shaft disposed therein, each of said commutator segments having an arcuate shape conforming to the curvature of said elongated tubular portion and having a pair of fingers, said hub portion of said insulator having angularly spaced ribs extending therefrom and axially extending recesses formed therein therebetween said ribs, each of said commutator segments having a pair of fingers formed therein and straddling one of said ribs with said fingers extending into the recesses adjacent thereto, and each of said commutator segments having a soldering post upstanding from said segment and formed from a portion of the commutator segment cutout to form said fingers, at least one insulating washer coaxially disposed around said commutator segments, and resin adhesive means bonding said commutator segments and said insulator in assembled relation.

11. An electric motor comprising: permanent magnet means defining an armature-receiving opening disposed about a central axis, a supporting frame including at least one substantially U-shaped channel section having two sides joined by a web portion, said permanent magnet means disposed within said supporting frame and secured adjacent said web portion, a motor shaft, a commutator, an armature including a core and windings, said commutator and armature rotatably carried on said motor shaft, a bearing assembly including a first bearing support element carrying a first motor bearing, said first bearing support element disposed adjacent a first end of said frame and secured substantially adjacent one end of said web portion, a bearing and brush assembly including a second support element carrying a second motor bearing, said motor shaft journaled in said first and second motor bearings, said second support element also including electrical brush means engaging said commutator, spring means carried on said second support element for biasing said electrical brush means into constant contact with said commutator, said second support element disposed within said supporting frame and secured adjacent said web portion.

References Cited by the Examiner
UNITED STATES PATENTS

| | | | |
|---|---|---|---|
| 1,525,826 | 2/1925 | Perlman | 310—50 |
| 3,023,332 | 2/1962 | St. Charles | 310—254 |
| 3,135,887 | 6/1964 | Schaffan | 310—154 |
| 3,156,838 | 11/1964 | Winther | 310—12 |

MILTON O. HIRSHFIELD, *Primary Examiner.*

L. L. SMITH, *Assistant Examiner.*